United State
Montgomery et al.

[11] 3,804,490
[45] Apr. 16, 1974

[54] PULSE MODULATION AND CAVITY DUMPING LASERS

[75] Inventors: Robert M. Montgomery; Eddie H. Young, Jr., both of Indialantic; Richard H. Johnson, Palm Bay, all of Fla.

[73] Assignee: Harris-Intertype Corporation, Cleveland, Ohio

[22] Filed: May 8, 1972

[21] Appl. No.: 251,019

[52] U.S. Cl. .............................. 350/161, 331/94.5
[51] Int. Cl. ............................................. G02f 1/16
[58] Field of Search ............ 350/160, 161; 331/94.5

[56] References Cited
UNITED STATES PATENTS
3,297,876  1/1967  DeMaria ............................ 331/94.5

*Primary Examiner*—William L. Sikes

[57] ABSTRACT

A method and apparatus for deflecting light using a propagating index of refraction gradient which is produced in an acousto-optic modulator by an avalanche semiconductor circuit to refract an incident light beam whose width is less than one half of the acoustic wave's wavelength at an angle which is a function of the amplitude of the acoustic input. The deflector can be used as a cavity dumping device or a scanner.

5 Claims, 9 Drawing Figures

FIG. 3A  STRAIN

FIG. 3B  ± INDEX OF REFRACTION

T=33.3 nsec

PULSE MODULATION AND CAVITY DUMPING LASERS

BACKGROUND OF THE INVENTION

The present invention relates generally to acousto-optic deflectors, and more particularly to an acousto-optic deflector whose angle of deflection is a function of the amplitude of the acoustic wave.

DESCRIPTION OF THE PRIOR ART

Fast modulators or deflectors, using the electro-optical effect, have been used to couple energy out of a laser cavity. However, high efficiency and repetition rate has been prevented by such serious drawbacks as optical losses, alignment problems and the requirement of high driving power. One solution to this problem, as described by D. Maydan in *Fast Modulator for Extraction of Internal Laser Power*: Journal of Applied Physics, Volume 41, No. 4, pp. 1,522–1,559, Mar. 15, 1970, is the use of a Bragg angle acousto-optical modulator.

In a Bragg angle acousto-optic modulator, the light beam is introduced at a Bragg angle into the modulator. The acoustical wave then interacts with the incoming light beam to diffract said light beam. The angle of diffraction of the incoming light beam is a function of the light wave length and the acoustic wave length. This angle is approximately equal to $\lambda_l/\lambda_a$, where $\lambda_l$ is the light wavelength and $\Lambda_a$ is the acoustic wavelength. The scattering or deflection efficiency is a function of the light's wave length and the acoustical power applied to said modulator. Generally, extensive electronic equipment is used to generate the acoustic wave in the Bragg angle acousto-optic modulator and equipment alignment is critical.

SUMMARY OF THE PRESENT INVENTION

The present invention deflects light at an angle which is the function of the amplitude of an acoustic wave in an acousto-optic modulator. A transducer is pulsed to resonate for at least one cycle and to produce, in an acoustic modulator, a sinusoidal strain wave. This strain wave produces a corresponding sinusoidal index of refraction. The incoming light is reduced in diameter or focused to a diameter or waist of less than one-half of the acoustic wave length. The interaction of the strain wave and the incoming light causes the light to refract. The angle of refraction is proportional to the slope or gradient of the index of refraction. This slope or gradient is approximately linear during a major portion of the sinusoidal curve. Since the frequency of the acoustic wave, the strain wave, and the index of refraction wave are the same, an increase in amplitude causes an increase in gradient or slope. Thus, the refracted angle is a function of acoustical amplitude instead of the ratio of light wave length to acoustic wave length as in the Bragg angle modulators.

OBJECTS OF THE INVENTION

A primary object of the present invention is to provide a new and improved method and apparatus for deflecting light in an acousto-optic modulator.

Another object is to provide an efficient and economical means for cavity dumping.

A further object of the invention is to provide a deflector for use as a laser scanner.

Still another object of the invention is to provide an acoustic deflector using a propagating index of refraction gradient.

A still further object of the present invention is to provide a means to refract light at an angle which is a function of the amplitude of an acoustical input.

An even further object is to provide an acousto-optic modulator using relatively simple electronic drive means.

A still further object of the invention is to provide an acoustic light deflector whose angle of deflection is proportional to the slope of the strain wave front produced therein, and is constant for a linear slope.

The above and still further objects, features and attendant advantages of the present invention will become apparent from a consideration of the following detailed description of certain preferred and exemplary embodiments thereof, especially when taken in conjunction with the accompanying drawings.

BRIEF DESCRIPTION OF THE DRAWINGS

FIGS. 3a, 3b, 3c and 3d are graphs of the relationship of the acoustic, strain and index of refraction waves;

DESCRIPTION OF THE PREFERRED EMBODIMENTS

Figure 1:
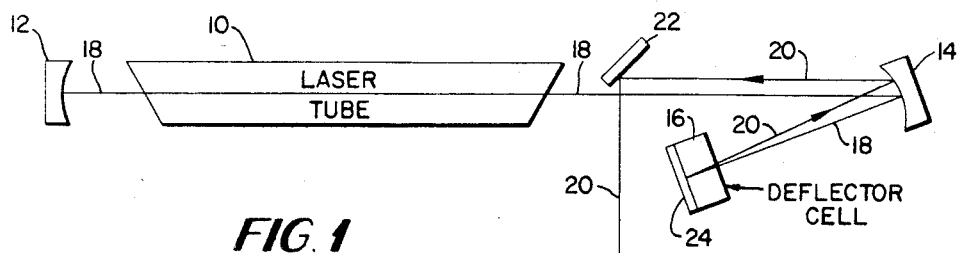
FIG. 1 is a diagram of the preferred embodiment of the deflector cell used for cavity dumping.

FIG. 1 illustrates the use of the refraction index gradient beam deflector to suddenly divert the light content of a laser cavity into an output beam. Laser tube 10 supplies light beams 18 which reflect from spherical reflectors 12 and 14 and a flat reflecting surface 24 in the back of the index gradient beam deflector 16. In the non-dumping mode, beam 18 continuously reflects between the three surfaces and through the laser tube. In the deflection or dumping mode, the index gradient beam deflector deflects the incoming beam 18 to the flat reflecting surface 22 to provide an output beam 20.

Figure 2:
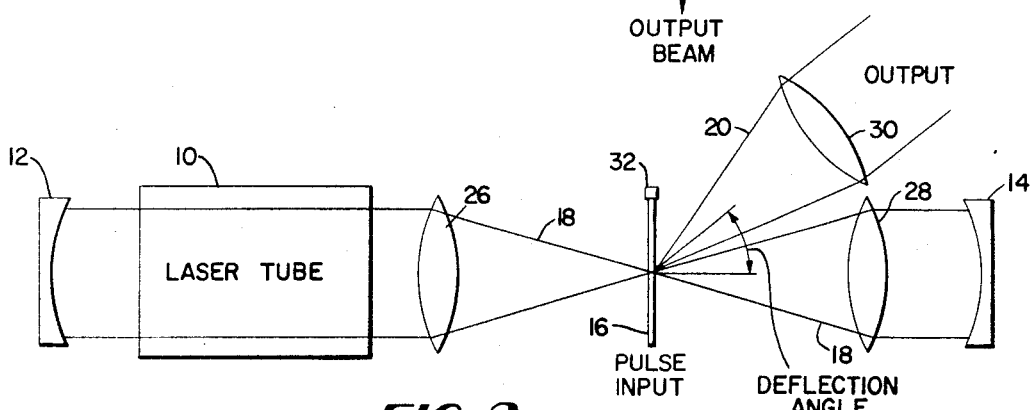
FIG. 2 is another preferred embodiment of the deflector cell used for cavity dumping.

Another embodiment, as shown in FIG. 2, shows an index gradient beam deflector without the reflective back. Lenses 26 and 28 focus the laser cavity's internal beam to a point on said deflector. An acoustical transducer 32 is shown in FIG. 2. It is to be understood that this transducer is present with every index gradient beam deflector. As in FIG. 1, in the non-deflection mode the internal laser beam is continuously reflected back and forth. Upon an input from transducer 32, a beam of light is dumped from the laser cavity through lens 30.

As specifically shown in FIG. 2, the laser beam is focused to a small spot to interact with the acoustic beam. This reduction in beam diameter minimizes the acoustic pulse transit time across the laser beam. For the mathematical models, to be discussed hereafter, and in actual application, it has been found that for the proper functioning of the index gradient beam deflector, the laser beam diameter should be smaller than one-half of the acoustic wave's wavelength.

It should be noted that any means may be used to reduce the laser beam's diameter or waist. In FIG. 1, the spherical reflectors focus beam 18 to the required diameter in deflector 16. Reduction by aperture means has also been used.

The basic theory of operation for the index gradient beam deflector is that the deflection angle of the incoming laser beam is constant when the acoustic wave front is a linear ramp. At a high frequency and a large amplitude, a majority of the acoustic wave front has a linear slope. The deflection angle in the index gradient beam deflector is proportional to the slope of the strain wave front produced by the acoustical wave. This mode of operation is different from the usual acoustic Bragg deflector, for which the deflected beam angle is approximately equal to $\lambda_l/\Lambda_a$.

In the present index gradient beam deflector, the deflection of light is produced by a change in the refractive index of the deflector. The relationship between the index of refraction, the strain wave, and the acoustic wave is shown in FIGS. 3a, 3b, 3c and 3d.

Figure 3C:
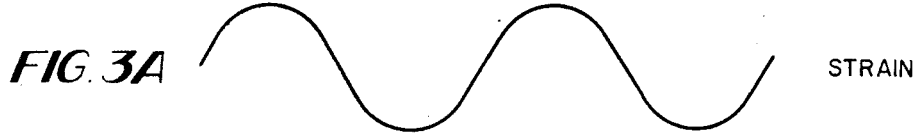
Figure 3C:
Figure 3C:
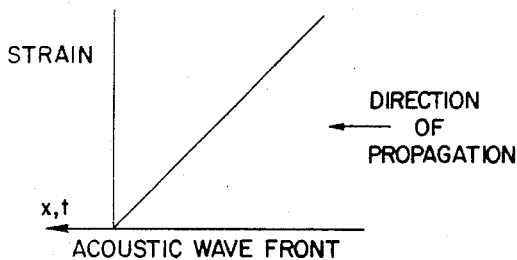
Figure 3D:
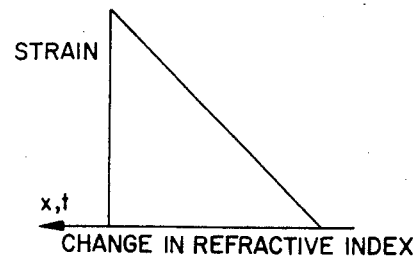

As can be seen from FIG. 3c, the acoustic wave and strain wave are directly proportional, which is to be expected. FIGS. 3a and 3b show that the strain wave and the index of refraction wave are of the same frequency and 180° apart. Curved segment $B_1B_2$ is basically linear and constitutes the linear index of refraction gradient which is the basis of the present invention. As can be seen from curve 3d, the refractive index n decreases when it experiences an increase in acoustic strain wave and the change in n has been found to be $$\Delta n = -n_o^3 \, ps/2$$

where $p$ equals photoelastic coefficient and $s$ equals strain. The angle of deflection produced by the small changes in the index of refraction has been found to be $$\Delta \psi = 1/w \, (\tfrac{1}{2} \, [L/H] \, M_2 \, P_{ac})^{1/2}$$

where $M_2$ equals the figure of merit, $w$ equals diameter of focus spot, $P_{ac}$ equals peak acoustic power, and $L/H$ equals transducer length over height. From this equation, it is perfectly clear that the angle of deflection is directly a function of amplitude of the acoustical input. The deflection efficiency, which is defined as the fraction of light coupled out of the system, is expressed as $$\eta = \pi/\lambda \, (\tfrac{1}{4} \, [L/H] \, M_2 \, P_{ac})^{1/2}$$

where $\lambda$ is the wavelength of the laser light. This delfection efficiency is similar to the parameter in the Bragg defraction cell. Each is a function of the wave length of the light and the peak acoustical power.

Figure 4:
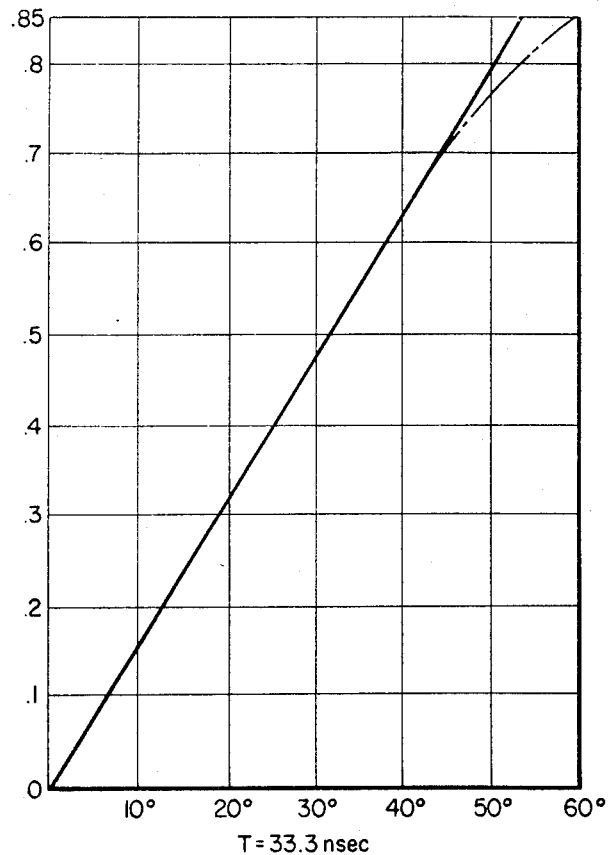
FIG. 4 is a graph of a 30 MHz sine wave.

The basic principle of operation of the index gradient deflector, as stated above, is the production of a linear index of refraction gradient for the transit time of the light through the deflector or modulator. For purposes of illustration, let it be assumed that the modulator is made of fused quartz and that the diameter of the focused laser spot is 33 microns. The transit time of the laser through the modulator is 0.5 nanoseconds. A convenient way of obtaining the required linear ramp of a duration equal to the transit time is to charge an acoustical transducer to a high voltage and let it relax suddenly. The transducer will ring in its fundamental mode or resonate for several cycles. The early portion of the sine wave closely approximates a linear ramp. For a 30 MHz sine wave, the first 5 nanoseconds have a fairly constant slope as shown in FIG. 4. Thus for a 30 MHz sine wave induced in the index beam deflector, a light beam of a transit time of 5.5 nanoseconds has approximately a 10 nanosecond linear index of refraction gradient to interact with. Therefore a constant angle of deflection can be predicted in a practical application.

The slope of the ramp or gradient is a function of the amplitude of the acoustical input, since the frequency is determined by the transducer. Thus to change the deflection angle, one need only increase the voltage input. This increases the versatility of the system over the Bragg angle deflector where the wavelength of the light or the acoustic wave must be changed to change the angle of deflection.

Figure 5:
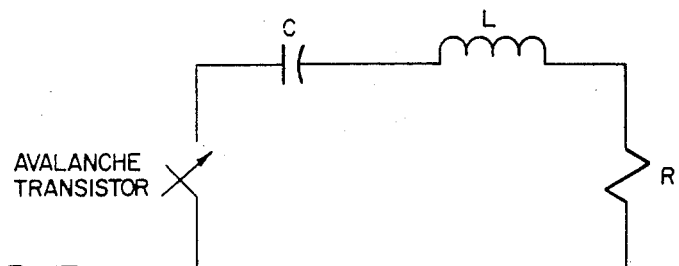
FIG. 5 is a schematic of the equivalent transducer circuit.

The equivalent circuit for the transducer is shown in FIG. 5. Near the resonant frequency, it can be approximated by a network consisting of linear lumped elements where the resistor in the circuit represents the acoustic power flow into the modulator. The current in the circuit is given by the equation $$i = V_0/\omega L \, \sqrt{1-\xi^2} \, e^{-\xi \omega t} \, \sin \omega \, \sqrt{1-\xi^2} \, t$$

where $\xi$ equals $1/2Q$. The sudden relaxation of the high voltage on the transducer is achieved by an avalanche semi-conductor, and is schematically shown as a switch. To continue the above example, the peak acoustical power is 19 watts for initial charge to 200 volts. It should be noted that the charging time of the transducer is of the order of microseconds which corresponds to the order of recovery time of the laser. A comprehensive analysis of equivalent circuits for piezoelectric transducers can be found in "Physical Acoustics," Volume 1, Part A, Academic Press, pp. 238–243, 1964 by Don Berlincourt et al.

Another example of the high efficiency of the index gradient beam deflector is shown by an experiment performed with a 10 MHz transducer. Under CW operating conditions, the cell operated in the Debye Sears region where the first order refraction efficiency was limited to a maximum of 32%. Many side orders were generated at high input power levels. When the laser beam focused to 80 microns in diameter and 160 volts discharged into the transducer, the maximum deflection efficiency was found to be approximately 90% with 100 nsec. wide pulses. It should be noted that since the slope of oscillation of the oscillating wave changes inside every half cycle, the deflection angle will alternate in directions.

Figure 6:
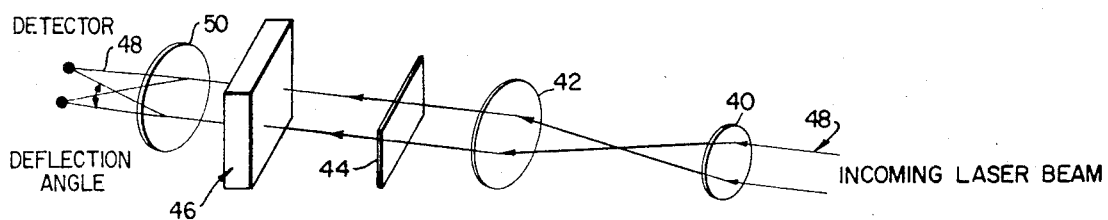
FIG. 6 is a block diagram of a preferred embodiment of the deflector cell used in a scanner.

The index gradient deflector has been found to be a practical and efficient scanner. This use is suggested by the sharp, distinct appearance of the deflected light pulse. As shown in FIG. 6, transparency 44, to be scanned, is placed in front of the deflector cell 46. The transparency 44 is uniformly illuminated by incoming laser beams 48 that have been reduced in diameter by lenses. As the region of the acoustic wave which creates a large linear index of refraction gradient propagates down the deflector cell, behind the transparency, part of the incoming light will be deflected out of the system to a detector. This deflected light is received by a photodetector and the output displayed on an oscilloscope. The results will be a plot of the transmission function of the transparency. Thus, a uniformly illuminated transparency is scanned by the propagation of an acoustic wave down the index gradient beam deflector.

The scanner as shown in FIG. 6 has been found to have 850 resolvable spots.

The index gradient beam deflector described can be designed to yield a high efficiency light beam of varying pulse widths. A wide range of results may be achieved from the variety of commercially available sources of laser light, acoustical transducers, and acousto-optic materials.

From the above description of the preferred embodiments, it will become apparent that the present acousto-optic deflector deflects an incoming light beam at an angle dependent upon and proportional to the amplitude of a strain wave front induced therein and is constant when the index of refraction gradient of the deflector is linear.

While we have described the preferred embodiments of our invention, it will be clear to those skilled in the art that variations in the specific details of construction, which have been illustrated and described, may be resorted to without departing from the spirit and scope of the invention as defined in the appended claims.

What is claimed is:

1. An acoustic light deflector for deflecting a pulse beam of light received from a light source by a substantially constant predetermined selectable angle throughout the duration of the pulse of light comprising means for limiting said beam to a predetermined width, a deflection cell through which said beam passes at its place of said predetermined width, a transducer contacting said deflection cell for producing an acoustic wave in said cell transversely to said light beam, voltage means for initially precharging said transducer to a desired predetermined value of voltage to predetemine the amplitude of said acoustic wave, and switching means connected parallel with said transducer for suddenly electrically discharging said transducer to cause said transducer to oscillate at its resonant frequency to produce said acoustic wave, said actoustic wave producing a wave of variations of index of refraction in said deflection cell having a substantially constant gradient of index of refraction in a fractional-wavelength region of said acoustic wave, said predetermined beam width and the time interval during which said pulse beam of light is in said deflection cell being small enough that light occurs only in said region, whereby the gradient of index of reflection produced by said acoustic wave is substantially constant throughout the width and duration of said pulse beam of light in said deflection cell and all of said beam of light is deflected by a substantially constant predetermined selectable angle.

2. An acoustic light deflector as in claim 1, wherein said switching means includes an avalanche semiconductor.

3. An acoustic light deflector as in claim 1 and wherein said means for limiting said beam comprises means for limiting said light beam's diameter to less than one-half of said acoustic wave's wavelength.

4. A method of light deflection comprising
   providing a deflection cell and an adjacent transducer having a resonant frequency,
   precharging the transducer with an electrical charge from a voltage source,
   short-circuiting the electrical charge of the transducer to resonate the transducer and produce an acoustic strain wave propagating through said deflection cell and having a wavelength.
   reducing the width of a light beam to be deflected to less than one-half the wavelength of the spatial variations of the index of refraction which results from the acoustic wave in the deflection cell,
   directing the reduced width light beam through said deflection cell transversely to the direction of propagation of the acoustic wave therein, and
   limiting the time interval during which said light beam is deflected to an interval during which the gradient of the index of refraction in the cell at the light beam is substantially constant,
   whereby the pulse beam of light is deflected by a substantially constant predetermined selectable angle throughout the duration of the pulse,
   said angle being selectively predetermined by selectably predetermining a voltage level to which said transducer is precharged.

5. A method as defined in claim 4 and wherein the step of short-circuiting the electrical charge of the transducer comprises the step of short-circuiting the transducer by rendering conductive an avalanche transistor that is connected in parallel with said transducer.

* * * * *